N. D. FORD.
BROODER.
APPLICATION FILED MAY 21, 1909.
973,420.
Patented Oct. 18, 1910.
Fig. 1
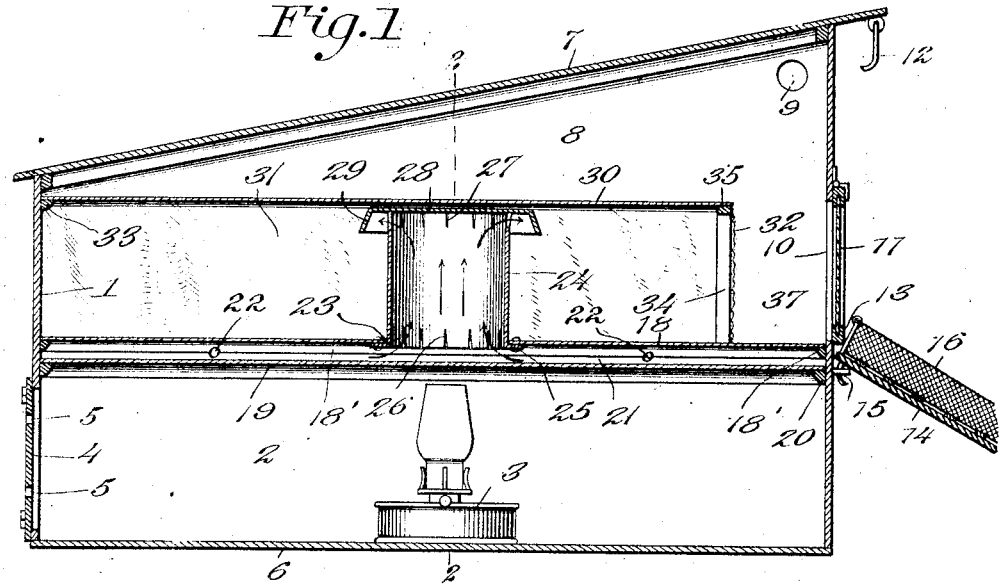
Fig. 2
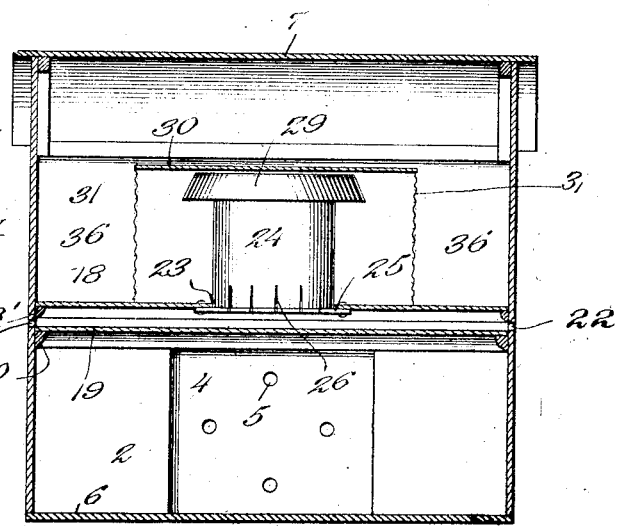
Fig. 3
Witnesses
Phil E. Barnes
C. C. Hines
Inventor
Norman Dwight Ford.
By Victor J. Evans
Attorney

UNITED STATES PATENT OFFICE.

NORMAN DWIGHT FORD, OF ANSLEY, NEBRASKA.

BROODER.

973,420.  Specification of Letters Patent.  Patented Oct. 18, 1910.

Application filed May 21, 1909. Serial No. 497,516.

*To all whom it may concern:*

Be it known that I, NORMAN DWIGHT FORD, a citizen of the United States, residing at Ansley, in the county of Custer and State of Nebraska, have invented new and useful Improvements in Brooders, of which the following is a specification.

This invention relates to brooders, and its object is to provide a brooder which is simple of construction, efficient in operation and inexpensive to manufacture.

The invention consists in the novel construction, combination and arrangement of parts as herein fully described, illustrated and claimed.

In the accompanying drawings:—Figure 1 is a central vertical front to rear section of a brooder constructed in accordance with my invention. Fig. 2 is a vertical transverse section on the line 2—2 of Fig. 1. Fig. 3 is a detail view of the outer portion of the platform.

The frame or casing of the brooder may be of any suitable dimensions and made, except as to the parts hereinafter specified, of wood or other suitable material. It embodies a base chamber or heating compartment 2 to contain a lamp or other heater 3 and is provided with a door 4 through which the lamp may be inserted and removed, said door having ventilation openings 5. The said base compartment may be provided with a bottom or floor 6, as shown, or may be bottomless, in which event the lamp may be supported upon a base board.

The top of the frame or casing slopes downwardly from front to rear in the usual manner and is closed by a cover 7 which may be hinged so as to be opened and closed or be bodily removed, as desired. The upper portion of the casing forms a chicks' chamber or compartment 8 to which access is afforded through the open top when the cover is removed. The upper front portion of each side wall of said chamber 8 is provided with one or more openings 9 for the inlet of fresh air and the outlet of vitiated air. At the front of the chamber is a doorway 10 for the ingress and egress of the chicks when they are allowed to run out. This doorway is adapted to be closed by a glass-paneled door 11, hinged to the brooder and adapted to be held open by a hook 12 on the brooder adapted to engage the free edge 13 of the door. A platform 14 is provided to form an approach for the travel of the chicks from the brooder to the ground, and vice versa, when they are allowed this freedom of liberty. This platform is supported in an inclined position by one or more hooks 15 adapted to engage a corresponding number of eyes 15′ on the brooder, whereby it may be detachably hinged to the brooder so that its free end may rest upon the ground to support it in an inclined position and so that it may be propped or otherwise supported in a horizontal position or removed when desired. Wire screen guards 16 are provided at the sides of the platform to prevent the chicks from falling off the same, and a similar transverse guard 17 is provided for use at the outer end of the platform when the latter is horizontally disposed to form a small runway for the chicks until they are old enough to run from the platform to the ground. The guard 17 is provided with end pieces pivoted at their lower ends to eyes 17′ at the forward edge of the platform, so that it may be swung from a vertical to a horizontal position, and to the upper ends of the end pieces are pivoted hooks or other fastening devices 17ª adapted to engage keeper eyes 17ᵇ upon the upper ends of posts or stems at the forward ends of the guards 16, whereby the guards 17 may be detachably held in a vertical position.

The chamber 8 is provided with a bottom 18 which rests on cleats 18′ and is removable through the top of the casing for cleansing. This bottom 18 is arranged above a metallic partition plate 19 fastened to cleats 20 and separating the heating chamber from the chicks' chamber. The said bottom and partition are arranged a desired distance apart to provide an air space 21 to which a restricted amount of air may enter from the exterior through one or more inlets 22.

In the center of the bottom 18 is formed an opening 23 receiving the lower end of a cylindrical flue or heat distributing tube 24. The lower end of this tube is provided with an outwardly extending flange 25 extending under the floor 18 and riveted or otherwise fastened thereto. The lower and upper ends of the tube are respectively provided with slits 26 and 27 providing outlet ports for the discharge of heated air from such portions of the tube. A removable cover plate 28 rests on and extends laterally beyond the same and is provided with an outwardly and downwardly inclined deflecting flange 29.

The tube is inclosed within the chamber 8 by a hover comprising a canopy or plate 30 and depending side and front flaps 31 and 32 secured at their upper edges to the canopy top and extending down to the floor 18. The hover is removably supported by a rear cleat 33 secured to the rear wall of the casing and a front supporting member formed of uprights 34 and a connecting cross piece 35 secured to the floor 18, upon which cleat the rear and front edges of the canopy board respectively rest. If desired, the said supporting member may be fixed to the front edge of the canopy board and rest loosely upon the floor 18. The flaps are arranged to overlap at their ends to prevent the too rapid escape of heat from the hover. It will be observed that the hover is spaced from the side and front walls of the chamber 8 to provide intervening side and front passage 36 and 37 of sufficient sizes to accommodate a number of chicks.

In practice, it will be understood that the flaps are made of a fabric porous enough to afford effective ventilation and light enough to yield and permit the free passage of the chicks from the hover to the passages 36 and 37, and vice versa. The heat generated by the lamp is taken up by the partition 19, which forms a radiating plate, is transmitted by radiation to the space 21 and heats the air therein. This heated air passes up into the flue or distributing tube and passes outward through the upper and lower sets of ports therein into the base and upper portion of the hover. Sufficient heated air passes directly through the lower ports into the hover to keep the lower portion of the hover at a proper temperature, the floor 18 being kept warm and dry by the air within the space 21. The greater portion of the heated air, however, discharges from the upper sets of ports of the tube and is deflected downward upon the chicks by the deflecting flange 29, thus closely simulating the character of warmth supplied by the body of a hen to a brood. As a result, the chicks will be kept warm and dry, a gradual change of air taking place in an obvious manner, whereby proper ventilation is insured. By the construction described, all odors from the lamp are retained within the chamber 2 and prevented from entering the chamber 8 and contaminating the air therein. By the provision of the passages 36 and 37, which may be termed safety spaces, crushing of the chicks from crowding is avoided, as, if any excess number pass into the hover, the yielding flaps will allow a certain number to be crowded out into said spaces 36 and 37 so that crushing of the chicks from the stated cause can not occur.

From the foregoing description, the construction, operation and mode of use of my improved brooder will be readily understood, and it will be seen that the invention provides a brooder which in addition to having the advantages mentioned is simple of construction and may be manufactured and sold at a low cost.

Claim.

A brooder having a heating compartment, a chicks' chamber above the same, an intervening air passage, provided with an opening therein, a hover within the chicks' chamber, a distributing tube longitudinally slitted at its lower end to form ports and free portions, said free portions extending into said opening and bend against the under side of the wall thereof, and longitudinally slitted at its upper end to form ports for the flow of the heated air into the hover, and a cover upon the top of the tube provided with a depending flange surrounding the upper ports.

In testimony whereof I affix my signature in presence of two witnesses.

NORMAN DWIGHT FORD.

Witnesses:
C. H. F. STEINMUIR,
E. H. GAMUS.